(No Model.)
G. B. HAKINS.
APPARATUS FOR PRESERVING EGGS.
No. 333,069. Patented Dec. 22, 1885.
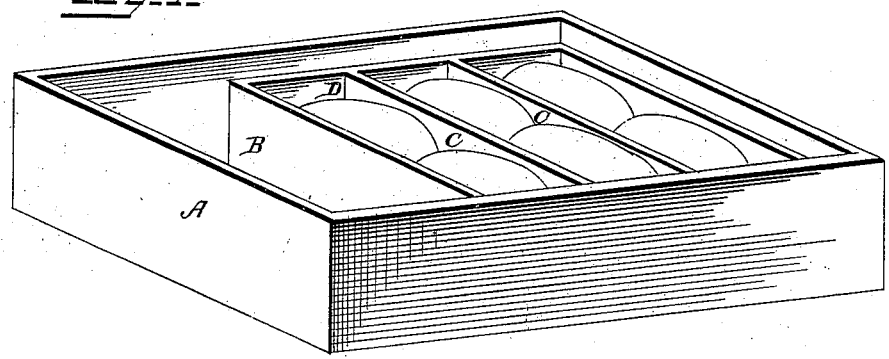
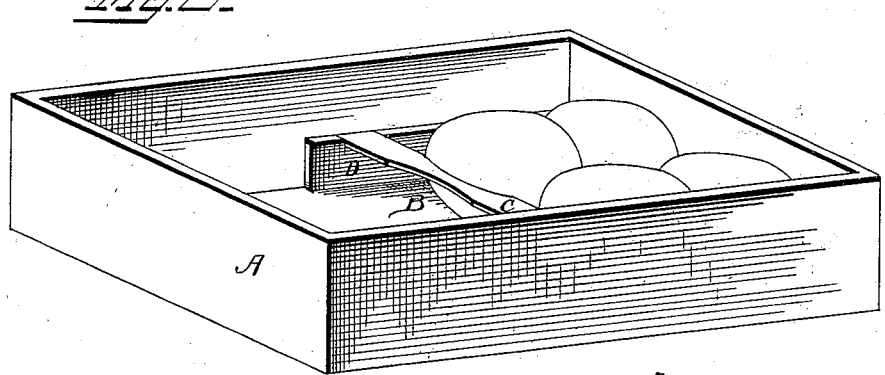
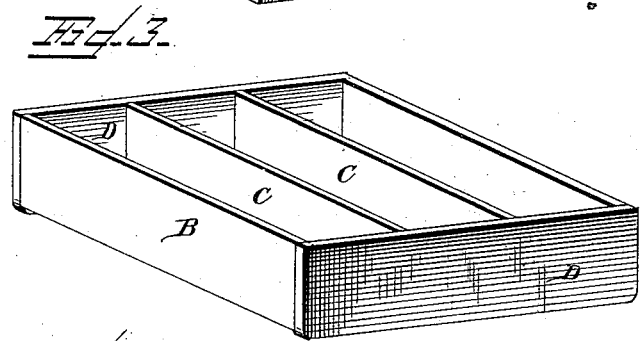
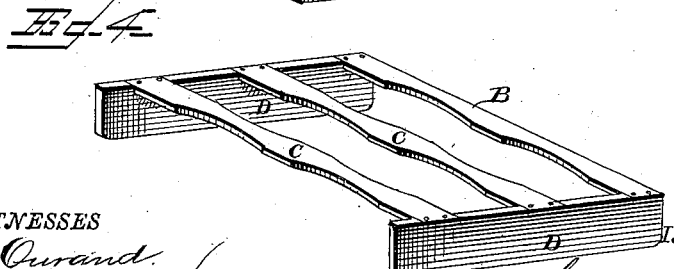
WITNESSES
F. L. Durand
Edward Stanton
INVENTOR
George B. Hakins,
By Louis Bagger & Co.
Attorneys.

UNITED STATES PATENT OFFICE.

GEORGE B. HAKINS, OF NORWOOD, NEW YORK, ASSIGNOR OF ONE-HALF TO HENRY G. PERT AND HENRY M. KINSMAN, BOTH OF SAME PLACE.

APPARATUS FOR PRESERVING EGGS.

SPECIFICATION forming part of Letters Patent No. 333,069, dated December 22, 1885.

Application filed September 19, 1885. Serial No. 177,579. (No model.)

*To all whom it may concern:*

Be it known that I, GEORGE B. HAKINS, a citizen of the United States, and a resident of Norwood, in the county of St. Lawrence and State of New York, have invented certain new and useful Improvements in Apparatus for Preserving Eggs; and I do hereby declare that the following is a full, clear, and exact description of the invention which will enable others skilled in the art to which it appertains to make and use the same, reference being had to the accompanying drawings, which form a part of this specification, and in which—

Figure 1 is a perspective view of a tray with eggs, provided with my improvement. Fig. 2 is a similar view of a slight modification of the same, and Figs. 3 and 4 are respectively perspective views of the two forms of the improvement.

Similar letters of reference indicate corresponding parts in all the figures.

My invention has relation to apparatus for preserving eggs; and it consists in the improved construction and combination of parts of a device; whereby the eggs in a tray may be turned so as to retain the yelks of the eggs in their proper position in the middle of the eggs, and thus prevent the eggs from becoming spoiled, as hereinafter more fully described and claimed.

In the accompanying drawings, the letter A indicates the tray, in which the eggs are placed in rows. B is the frame, which is placed within the tray and fits within the same, having its sides sliding close to the insides of the side pieces of the tray, while the length of the frame is shorter than the tray to the extent of the normal length of one-half the circumference of an egg, so that the frame may slide lengthwise within the tray. The frame is provided with partitions C, placed at a distance from each other equal to the mean diameter of an egg, and the eggs rest in the rows formed by these partitions with their ends bearing against each other, the eggs resting transverse to the length of the tray. The lower edges of the side pieces, D, of the frame slide upon the bottom of the tray, and it will be seen that when the frame is slid within the tray the eggs, which rest with their sides upon the bottom of the tray, will be turned or rolled over the bottom of the tray, while they will retain their relative positions to each other, and without the necessity of touching the eggs with the hands.

In Figs. 1 and 3 the partitions are shown as consisting simply of flat strips secured edgewise across the frame; but the partitions may be made as shown in Figs. 2 and 4, consisting of strips placed upon their flat sides and secured at their ends to the upper edges of the side pieces of the frame, and having their edges cut out to form rounded notches or recesses, which will bear against the sides of the eggs; or the frame and partitions may be made of wire or sheet metal, either with plain straight partitions or with partitions curved to conform to the shape of the eggs, the straight partitions being the simplest of construction, while the partitions having curves conforming to the curved sides of the eggs and fitting against the eggs will retain the eggs more perfectly in their relative positions to each other and insure a more accurate turning of the eggs.

It will be seen that by sliding the frame one way one day and the next day returning the frame to its former position in the tray the eggs will each day be turned to rest upon their opposite sides, which will prevent the eggs from having their yelks sinking to one side, and the turning of the eggs will thus prevent their spoiling.

This apparatus may also prove very useful for turning the eggs in an incubator, as well as for simply preserving eggs from spoiling, and if a packing-case is constructed with these sliding frames and the frames are so constructed that the eggs will be retained without any danger of their being broken the eggs will be kept fresh during long transportations by simply tilting the ends of the boxes while they are being transported, turning the eggs once a day being sufficient to keep them in good condition.

Having thus described my invention, I claim and desire to secure by Letters Patent of the United States—

1. In an apparatus for preserving eggs, the combination of a rectangular tray with an open-bottomed rectangular frame inserted into and adapted to slide upon the bottom of said tray, said sliding frame having partitions running crosswise to the length of the tray, and fitting with its sides against the sides of the tray, substantially as and for the purpose shown and set forth.

2. In an apparatus for preserving eggs, the combination of a rectangular tray with an open-bottomed rectangular frame inserted into and adapted to slide upon the bottom of said tray, said sliding frame having horizontal parallel partitions with notched or recessed edges running crosswise to the length of the tray, and fitting with its sides against the sides of the tray, substantially as and for the purpose shown and set forth.

In testimony that I claim the foregoing as my own I have hereunto affixed my signature in presence of two witnesses.

GEORGE B. HAKINS.

Witnesses:
GEO. B. SHEPARD,
DAVID A. SCOBIE.